UNITED STATES PATENT OFFICE.

WALTER S. LANDIS, OF NIAGARA FALLS, NEW YORK, ASSIGNOR TO AMERICAN CYANAMID COMPANY, OF NASHVILLE, TENNESSEE, A CORPORATION OF MAINE.

PROCESS OF PRODUCING AMMONIA.

1,154,640.  Specification of Letters Patent.  Patented Sept. 28, 1915.

No Drawing.  Application filed February 4, 1915.  Serial No. 6,167.

*To all whom it may concern:*

Be it known that I, WALTER S. LANDIS, a citizen of the United States, residing at Niagara Falls, in the county of Niagara and State of New York, have invented certain new and useful Improvements in Processes of Producing Ammonia; and I do hereby declare the following to be a full, clear, and exact description of the invention, such as will enable others skilled in the art to which it appertains to make and use the same.

This invention relates to a process for making ammonia from crude calcium cyanamid, or lime nitrogen, and has for its object to attain this result in a manner more expeditious and less costly than has heretofore been proposed.

With these and other objects in view the invention consists in the novel steps and combinations of steps constituting my process, all as will be more fully hereinafter disclosed and particularly pointed out in the claims.

In order that my invention may be clearly understood it is said:—In the manufacture of ammonia from crude calcium cyanamid, or lime nitrogen, according to the reaction

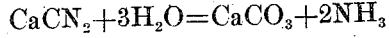

$$CaCN_2 + 3H_2O = CaCO_3 + 2NH_3$$

the operation was early carried out by piling briqueted calcium cyanamid on trays in a closed apparatus and subjecting this to the action of steam. But this involved much preliminary treatment of the crude cyanamid or lime nitrogen, and very great trouble in charging and discharging the decomposition apparatus. The operation of briqueting the cyanamid further transformed part of it into other compounds which did not readily yield up their content of nitrogen in the form of ammonia, and the process was therefore found to be very expensive because of its complexity and its low yields.

A later development consisted in putting lime nitrogen, or crude calcium cyanamid into an ordinary closed vessel, or boiler, and heating the same with water, boiling off the ammonia in the form of a gas mixed with steam, and running out the remaining sludge from the containing vessel. But in this case also it was found very difficult to insure a thorough cleaning of the retaining vessel, for the latter gradually built up with a hard shell of calcium carbonate which gave great difficulty in removal. Subsequently, this apparatus was changed in the manner of operation so that water was fed into the same, then the crude cyanamid, or lime nitrogen, and steam was injected into the mass to keep it stirred up, and to supply heat, thus preventing it settling on the sides and bottom. This involved, however, the continuous use of steam during the whole course of the operation; and while the operation in part avoided the difficulties previously met with, yet it used up unnecessarily large quantities of steam. According to my process on the other hand, I avoid this waste of steam, and make other changes in the prior processes as will now be disclosed.

I take advantage of the fact in carrying out my process that the above reaction is strongly exothermic, and therefore am enabled to use the steam for a short time only, or I may use it intermittently, or I, after attaining a reacting temperature by any suitable means, may use it continuously in a greatly diminished quantity. If I use the steam continuously, it may be supplied in a very small stream and therefore in a much less quantity than has heretofore been deemed possible. In fact, I have discovered that it is only necessary to heat the reacting mass by any suitable means to a comparatively low temperature, or to a temperature sufficient to start the reaction when the heat generated by the reaction will carry it as far as desired, or to completion; the mass being preferably subjected in the meantime to the steam or other heating agent at suitable intervals. But of course, as above stated, the heat may be continuously applied to said mass in lesser quantities during certain periods of the operation, so that with the aid of the exothermically generated heat the reacting temperature is maintained. I am not at present able to present exact figures of the thermo-chemical constants of this reaction, because the heat of formation of calcium cyanamid is unknown. But I have demonstrated that the reaction is in fact strongly exothermic as stated.

In my co-pending application, No. 7413, filed February 10, 1915, and entitled apparatus for producing ammonia, I have described one form of apparatus suitable for carrying out my process, which comprises a closed vessel, with proper filling and discharge openings, a stirring apparatus, also a means for introducing steam and compressed air, and an auxiliary control apparatus. In carrying out my process in the said apparatus, I charge water into the same or preferably liquor containing a solution of calcium cyanamid obtained from a previous operation in a manner to be described below. I then start the stirring apparatus rotating, and let into my vessel a predetermined quantity of crude lime nitrogen or calcium cyanamid preferably more or less finely ground. I prefer a comparatively coarsely ground cyanamid as compared to the usual grades used in direct fertilizer applications. This drops slowly through the feed opening and on striking the water, or liquor in the vessel, or the spray mentioned in my said co-pending application, it evolves acetylene, from the calcium carbid contained in the said cyanamid, and owing to the free lime present, it slowly hydrates. I remove the evolved acetylene by sweeping it out of the vacant space in the top of the apparatus with a suitable current of air, or other diluting gas such for example as flue gas, etc., so as to avoid any possibility of the accumulation of the acetylene and its accidental explosion. I use such a proportion of lime nitrogen and liquor as will ordinarily yield a rather thin slurry in the apparatus e. g. 2 parts by weight of liquor to one part of solids so that the stirrer will work through the mixture without undue resistance. After the charging is complete I close all openings of the autoclave, and preferably introduce superheated steam into the slurry until the manometer on the apparatus shows from say two to four atmospheres of pressure. This produces a temperature sufficient to start the reaction, and I then preferably close the steam inlet so as to cut off the steam entirely or I may almost close the same and employ only a small jet. A fairly rapid increase in pressure occurs in the apparatus when the reaction starts, due to the generation of ammonia, and in from 30 minutes to 1 hour, if all the valves are kept closed, pressures of above 25 atmospheres may be readily attained, depending upon the charge, the size of the apparatus, and how full it is. I may control these pressures so as to keep them within reasonable limits, either by discharging part of the gaseous contents, of the autoclave, after the steam is shut off, or by properly proportioning the amount of charge used to the size of the apparatus, leaving sufficient vacant space in the top of the same to properly accommodate the generated gases. I may then discharge the generated ammonia from the apparatus at any desired predetermined rate by a proper control of a discharge valve, until no substantial pressure exists.

The high pressure which may accumulate in the apparatus, causes naturally some ammonia to remain in solution in the slurry; and I usually prefer to repeat the above operation of admitting steam for a short period of time until a predetermined pressure is attained, when I again blow off the ammonia boiled out of the slurry, together with any that may be formed from an imperfect decomposition of the charge during the first steaming. I may even repeat this operation for a third time, to assure the decomposition of all the cyanamid and to further remove all the dissolved ammonia.

In order to insure practically all the ammonia being driven out of solution in the slurry, I may finally admit compressed air through the steam inlet, or through another similar inlet, that may be especially provided for this purpose, and thus displace the dissolved ammonia completely in a few minutes.

I may next discharge the contents of the apparatus through a discharge valve on the bottom, to a filter, thus separating the hot liquor from the solids, which liquor I send back into the apparatus for starting a new charge, and thus conserve its heat content and further cut down the steam consumption. Any ordinary type of filter, such as a vacuum-leaf, a pressure-leaf, or a plate and frame type is found to be satisfactory, but I prefer a horizontal vacuum leaf type of filter for this purpose.

In a large apparatus capable of receiving four tons of crude cyanamid, or lime nitrogen, at one charge, I find that in the whole cycle of operations of filling, decomposing and discharging, covering a period of about ten hours, I need only introduce steam in periods of about fifteen minutes each, and that three such periods yield an efficiency of 99 per cent. in the transformation of cyanamid nitrogen into ammonia. These results are shown by records over periods of several months running; and this efficiency is even exceeded where the filtration step is employed and the liquors returned to the apparatus in the cyclical process.

If steam is used one would naturally expect a condensation of the same in the apparatus, and, therefore, an increase in the bulk of the liquor during the operation. But I have found out that by the use of superheated steam I can actually cause an evaporation in my apparatus, and therefore, can subject my filter cakes to a proper washing without accumulating an excessive amount of liquor for return to the process.

It is, of course, possible to carry out the above process in combination with the process disclosed in my said application, above, by adding an alkali salt to the slurry, or I may mix dry sodium carbonate, or caustic soda, with the lime nitrogen or crude cyanamid, before it goes into the apparatus. In fact, the above high efficiencies of 99 per cent. were obtained by the use of such an addition reagent, to said cyanamid.

It will now be clear that the process just disclosed constitutes a wide departure from the older process of introducing steam during the whole course of the decomposition, particularly in the matter of the amount of steam or other heat consumed. My improvement of applying the steam for only a few minutes out of the full period, and utilizing the exothermic properties of the reaction, instead of applying it as in the older process during the whole time of the decomposition, enables me to use only about ¼ the boiler capacity that the older method required.

A further important advantage of my process resides in the fact that the whole apparatus is not continuously under high steam pressure, but for only a very small fraction of the time. In the prior existing processes on the other hand, the apparatus must operate under a pressure of 12 to 15 atmospheres continuously during the whole cycle of decomposition, with the attendant disadvantages. My process therefore, very greatly lessens the dangers of explosion, wear and tear on apparatus, particularly packings, and insures much less leakage, should defections develop.

It is, of course, self-evident that the mixing of crude calcium cyanamid and the liquor can take place outside the decomposition apparatus in a mixer specially provided for this purpose, and the slurry may then be run into the decomposition apparatus without departing from the spirit of the invention.

I have further found that in the hydration of lime nitrogen, or crude calcium cyanamid, and its transformation into ammonia, it is particularly important that the agitation occur practically continuously during the charging and reaction, otherwise this material will set in a hard mass in the apparatus; and it will be impossible to readily discharge it. This has been one of the chief faults in the older apparatus working upon the principle of an ordinary boiler without stirring apparatus. I have also found that lime nitrogen or crude cyanamid when dropped into water tends to form small, hard lumps with a dry, unaltered interior. By stirring vigorously during the charging I avoid the formation of these lumps, and, therefore, obtain a very much higher yield of ammonia from the calcium cyanamid charged.

It is of course obvious that those skilled in the art may vary the details of my process without departing from the spirit of the invention and therefore, I do not wish to be limited to the above disclosure except as may be required by the claims.

What I claim is:—

1. The process of making ammonia from commercial calcium cyanamid, or lime nitrogen, which consists in suitably applying heat to a solution of said cyanamid to bring it to a reacting temperature, and then lessening the applied heat to permit the reaction to proceed under its own evolved heat, substantially as described.

2. The process of making ammonia from commercial calcium cyanamid, or lime nitrogen, which consists in feeding said cyanamid to a vessel containing water to form a solution and to free acetylene gas; removing said gas from said vessel; applying sufficient heat to said solution to free ammonia therefrom; and then lessening said heat to permit the reaction to proceed exothermically, substantially as described.

3. The process of making ammonia from calcium cyanamid which consists in raising the temperature of a solution of said cyanamid to the reacting temperature by subjecting said solution to an intermittent action of steam for predetermined periods; and permitting the reaction to proceed exothermically, substantially as described.

4. The process of making ammonia from commercial calcium cyanamid, or lime nitrogen, which consists in feeding said cyanamid to a vessel containing water, agitating the mixture, thereby forming a slurry; subjecting said slurry to the action of steam at intervals; and permitting the reaction to proceed exothermically between said intervals, substantially as described.

5. The process of making ammonia from commercial calcium cyanamid, or lime nitrogen, which consists in feeding said cyanamid to a vessel containing water, agitating the mixture, thereby forming a slurry; subjecting said slurry to the action of steam at intervals; permitting the reaction to proceed exothermically between said intervals; and removing the evolved ammonia before admitting fresh steam, substantially as described.

6. The process of making ammonia from commercial calcium cyanamid, or lime nitrogen, which consists in forming a slurry from said cyanamid; removing any acetylene gas that may be generated; heating said slurry to the reacting temperature by admitting steam thereto; lessening the flow of said steam and permitting the reaction to proceed exothermically; removing the ammonia thus freed; admitting more steam to said slurry, and repeating the operation, substantially as described.

7. The process of making ammonia from crude calcium cyanamid, or lime nitrogen which consists in feeding to a vessel containing water, a predetermined amount of said cyanamid; stirring the slurry thus formed; removing the acetylene generated; supplying heat to said slurry sufficient to raise it to the reacting temperature; interrupting said heat and permitting the reaction to proceed exothermically; withdrawing the ammonia thus liberated; and repeating the heating and reaction steps until the desired quantity of ammonia is had, substantially as described.

8. An improved process of manufacturing ammonia from crude calcium cyanamid, or lime nitrogen, comprising reacting upon a slurry of said cyanamid in a closed vessel with steam alternately with the discharge of the ammonia generated, and followed by a current of compressed air, to more effectually drive off the said ammonia, substantially as described.

9. An improved process of manufacturing ammonia from crude calcium cyanamid, or lime nitrogen, comprising the reacting upon a slurry of said cyanamid in a closed vessel with steam alternately with the discharge of the ammonia generated and followed by a current of compressed air, then discharging said reaction vessel to a filter, separating the contained liquor from the filter cake, and returning the liquor to the reaction vessel for making up a new batch of slurry, substantially as described.

10. An improved process of manufacturing ammonia from crude calcium cyanamid, or lime nitrogen, characterized by introducing into a closed vessel water or liquor obtained from a previous operation, continuously stirring into the same said cyanamid, maintaining said stirring throughout the remainder of the operation, at the same time alternately admitting steam and removing the gaseous products of decomposition, finally removing the dissolved ammonia by introducing compressed air, discharging the contents of the apparatus to a filter, washing said filter cake, and re-introducing the liquor obtained into the apparatus for starting a fresh decomposition, substantially as described.

11. The process of making ammonia which consists in introducing crude calcium cyanamid, or lime nitrogen, into a vessel containing water; passing a gaseous fluid through said vessel above the level of the water, to remove any gases that may be evolved; stirring said cyanamid and water to form a slurry; admitting steam to said slurry until the temperature is sufficient to evolve ammonia and then cutting off said steam; withdrawing said ammonia from said vessel; repeating the admission of the steam to said slurry and the withdrawal of the evolved ammonia; then passing a gaseous fluid under pressure through said slurry to remove any dissolved ammonia; discharging the contents of said vessel into a filter to form a filter cake and to separate out the liquor; washing said filter cake; and returning said liquor to said vessel, substantially as described.

12. The process of making ammonia from crude calcium cyanamid or lime nitrogen, which consists in making a slurry of said cyanamid; adding an alkali to said slurry; then raising said solution to the reacting temperature, lessening the supply of heat and permitting the ammonia to be evolved exothermically.

13. The process of making ammonia from crude calcium cyanamid, or lime nitrogen, which consists in making a slurry of said cyanamid adding a carbonate of an alkali metal to said slurry; then raising said solution to the reacting temperature, lessening the supply of heat and permitting the ammonia to be evolved exothermically.

14. The process of making ammonia from commercial calcium cyanamid, or lime nitrogen, which consists in suitably applying heat to a slurry of said cyanamid to bring it to the reacting temperature; and continuously stirring said slurry during the reaction to prevent deposits on the walls of the container, substantially as described.

15. The process of making ammonia from commercial calcium cyanamid, or lime nitrogen, which consists in suitably applying heat to a slurry of said cyanamid to bring it to the reacting temperature; then cutting off said heat to permit the reaction to proceed exothermically; and continuously stirring said slurry during the reaction to prevent deposits on the walls of the container, substantially as described.

16. The process of making ammonia from commercial calcium cyanamid, or lime nitrogen, which consists in admitting superheated steam to a slurry of said cyanamid to bring it to the reacting temperature; then cutting off said steam to permit the reaction to proceed exothermically; and continuously stirring said slurry during the reaction to prevent deposits on the walls of the container, substantially as described.

In testimony whereof I affix my signature, in presence of two witnesses.

WALTER S. LANDIS.

Witnesses:
S. WARREN MAYS,
J. L. DOLAN.